(12) United States Patent
Li (10) Patent No.: US 9,661,300 B2
(45) Date of Patent: May 23, 2017

(54) DYNAMIC STEREO AND HOLOGRAPHIC IMAGE DISPLAY

(71) Applicant: Yang Li, Shaanxi (CN)

(72) Inventor: Yang Li, Shaanxi (CN)

( * ) Notice: Subject to any disclaimer, the term of this patent is extended or adjusted under 35 U.S.C. 154(b) by 189 days.

(21) Appl. No.: 14/688,727

(22) Filed: Apr. 16, 2015

(65) Prior Publication Data

US 2015/0222873 A1  Aug. 6, 2015

Related U.S. Application Data

(63) Continuation of application No. PCT/CN2013/085668, filed on Oct. 22, 2013.

(30) Foreign Application Priority Data

Oct. 23, 2012  (CN) .................... 2012 2 0572083 U (51) Int. Cl.
*G03H 1/04* (2006.01)
*H04N 13/00* (2006.01)
(Continued)

(52) U.S. Cl.
CPC ......... *H04N 13/0051* (2013.01); *G03B 35/24* (2013.01); *G03H 1/0005* (2013.01);
(Continued)

(58) Field of Classification Search
CPC .... G03B 35/24; G03H 1/0005; G03H 1/0443; G03H 1/268; G03H 2001/0088;
(Continued)

(56) References Cited

U.S. PATENT DOCUMENTS 5,745,197 A * 4/1998 Leung ................ G02B 27/2278
348/E13.02
6,097,394 A * 8/2000 Levoy ................ G02B 27/2271
345/419
(Continued)

FOREIGN PATENT DOCUMENTS

| CN | 1717065 A | 1/2006 |
| CN | 1893674 A | 1/2007 |

(Continued)

OTHER PUBLICATIONS

Sato et al, Three-dimensional TV using holographic stereogram, 2010.*

(Continued)

*Primary Examiner* — Shan Elahi
(74) *Attorney, Agent, or Firm* — Harness, Dickey & Pierce, P.L.C.

(57) ABSTRACT

A dynamic stereo and holographic image display includes: an image acquisition lattice, an encoder, a display panel, and a light shielding matrix. The image acquisition lattice acquires an image at each acquisition point. The encoder outputs the image acquired at each acquisition point to a corresponding block of the display panel for display. The display panel displays a corresponding image in each block. The light shielding matrix is disposed in front of the display panel, and restricts emission of light in a specified block on the display panel under the control of the encoder.

9 Claims, 6 Drawing Sheets

(51) Int. Cl.
*H04N 13/04* (2006.01)
*G03B 35/24* (2006.01)
*G03H 1/00* (2006.01)
*G03H 1/26* (2006.01)

(52) U.S. Cl.
CPC ........... *G03H 1/0443* (2013.01); *G03H 1/268* (2013.01); *H04N 13/0048* (2013.01); *H04N 13/0402* (2013.01); *H04N 13/045* (2013.01); *H04N 13/0409* (2013.01); *H04N 13/0488* (2013.01); *H04N 13/0497* (2013.01); *G03H 2001/0088* (2013.01)

(58) Field of Classification Search
CPC ........... H04N 13/0048; H04N 13/0051; H04N 13/0402; H04N 13/0409; H04N 13/045; H04N 13/0488; H04N 13/0497
USPC .......................................................... 348/40
See application file for complete search history.

(56) References Cited

U.S. PATENT DOCUMENTS

| | | | |
|---|---|---|---|
| 6,760,135 B1 | 7/2004 | Payne et al. | |
| 7,565,003 B2* | 7/2009 | Ashizaki | G03H 1/268 348/14.16 |
| 8,749,622 B2* | 6/2014 | Tseng | G02B 27/2242 348/40 |
| 2005/0226319 A1 | 10/2005 | Harada et al. | |
| 2006/0028400 A1* | 2/2006 | Lapstun | G02B 26/06 345/8 |
| 2006/0139235 A1* | 6/2006 | Lee | G09G 3/003 345/32 |
| 2006/0192746 A1 | 8/2006 | Ioki et al. | |
| 2007/0008619 A1 | 1/2007 | Cha et al. | |
| 2007/0285509 A1 | 12/2007 | Lee | |
| 2008/0144174 A1* | 6/2008 | Lucente | H04N 13/0406 359/463 |
| 2008/0226846 A1* | 9/2008 | Hill | G09F 1/06 428/13 |
| 2009/0051685 A1 | 2/2009 | Takagi et al. | |
| 2010/0033642 A1* | 2/2010 | Kim | G02B 27/2214 349/15 |
| 2010/0171811 A1* | 7/2010 | Kamins-Naske | G02B 7/00 348/40 |
| 2010/0253677 A1* | 10/2010 | Kroll | G02B 26/0875 345/419 |
| 2011/0001804 A1* | 1/2011 | Urey | G02B 27/225 348/51 |
| 2011/0234583 A1* | 9/2011 | Bakalash | G06T 15/06 345/419 |
| 2011/0234881 A1* | 9/2011 | Wakabayashi | H04N 5/2251 348/333.05 |
| 2012/0050459 A1* | 3/2012 | Yoon | G02B 27/22 348/40 |
| 2012/0092468 A1 | 4/2012 | Okamoto | |
| 2013/0022222 A1* | 1/2013 | Zschau | G03H 1/0808 381/306 |
| 2013/0033586 A1* | 2/2013 | Hulyalkar | H04N 13/0007 348/51 |

FOREIGN PATENT DOCUMENTS

| | | |
|---|---|---|
| CN | 101088298 A | 12/2007 |
| CN | 101387775 A | 3/2009 |
| CN | 101505433 | 8/2009 |
| CN | 101977332 A | 2/2011 |
| CN | 102056001 A | 5/2011 |
| CN | 102056001 A | 5/2011 |
| CN | 202004912 U | 10/2011 |
| CN | 102256147 | 11/2011 |
| CN | 102455520 A | 5/2012 |
| CN | 202424936 U | 9/2012 |
| EP | 1377079 A2 | 1/2004 |
| JP | 2009049751 | 3/2009 |
| TW | 455706 B | 9/2001 |

OTHER PUBLICATIONS

Kozacki et al, Holographic Capture and Display Systems in Circular Configurations, Apr. 2012.*
Wang et al, Stereoscopic Image Acquisition and Autostereoscopic Display, 2010.*
Watson et al, A Survey of 3DTV Displays: Techniques and Technologies, Nov. 2007.*
International Search Report issued Feb. 20, 2014 for PCT Application No. PCT/CN2013/085668 (and English translation), which the instant application claims priority to; 8 pgs.
Chinese office action and its English translation issued Dec. 5, 2016 for Chinese application No. 201380049937.1 filed Oct. 2, 2012 which is the parent application to the instant application, 12 pages.

* cited by examiner

DYNAMIC STEREO AND HOLOGRAPHIC IMAGE DISPLAY

CROSS-REFERENCE TO RELATED APPLICATIONS

This application is a continuation of international application No. PCT/CN2013/085668 entitled "Dynamic Stereo and Holographic Display" filed on Oct. 22, 2013 claiming priority to Chinese Patent Application No. 201220572083.8, entitled "Dynamic Stereo and Holographic Display", and filed on Oct. 23, 2012, both of which are hereby incorporated by reference in its entirety.

TECHNICAL FIELD

The present disclosure relates to the technical field of displays, and particularly, to a dynamic stereo and holographic display.

BACKGROUND

Currently, the traditional 3D images are composed of two groups of images (resulting from two cameras at an angle to each other during the shooting) on the screen, and the audiences have to wear polarized glasses to eliminate the ghost image (ensuring that one eye only receives one group of images), thereby forming parallax to produce a stereo sensation.

It is unnecessary to view the stereoscopic images by wearing the glasses when the AutoStereoscopic technique (i.e., the so called "real 3D technique") is used. The technique employs the so called "parallax barrier", so that two eyes receives different images, respectively, to produce the stereo effect.

However, any manner in the prior art cannot display a real holographic image.

SUMMARY

The embodiments of the present invention provide a dynamic stereo and holographic display, including:

an image acquisition lattice, an encoder, a display panel and a light shielding matrix;

wherein the image acquisition lattice acquires an image at each acquisition point;

the encoder is configured to provide the image acquired by the image acquisition lattice at each acquisition point to the display panel for display, wherein the image acquired at each acquisition point is provided to a corresponding block of the display panel for display;

the display panel is configured to display a corresponding image in each block; and the light shielding matrix is disposed in front of the display panel, and configured to restrict emission of light in a specified block on the display panel under the control of the encoder.

BRIEF DESCRIPTION OF THE DRAWINGS

In order to more clearly describe the technical solutions in the embodiments of the present invention, the drawings to be used in the descriptions of the embodiments will be briefly introduced as follows. Obviously, the following drawings just illustrate some embodiments of the present invention, and a person ordinarily skilled in the art can obtain other drawings from them without paying any creative effort. In which.

DETAILED DESCRIPTION OF THE EMBODIMENTS

In order that the objects, technical solutions and advantages of the embodiments of the present invention are clearer, the embodiments of the present invention will be further described in detail with reference to the drawings. Herein, the exemplary embodiments of the present invention and the descriptions thereof are used to explain the present invention, rather than restricting the present invention.

In order to display the dynamic stereo and holographic image and directly reflect different real sides of an object, the embodiments of the present invention provide a dynamic stereo and holographic display which has a simple and reasonable structure and good performances, and which is conveniently operable, and economical and practical.

The dynamic stereo and holographic display includes: an image acquisition lattice, an encoder, a display panel and a light shielding matrix; wherein the image acquisition lattice acquires an image at each acquisition point; the encoder is configured to provide the image acquired by the image acquisition lattice at each acquisition point to the display panel for display, wherein the image acquired at each acquisition point is provided to a corresponding block of the display panel for display; the display panel is configured to display a corresponding image in each block; and the light shielding matrix is disposed in front of the display panel, and configured to restrict emission of light in a specified block on the display panel under the control of the encoder.

In one embodiment, the light shielding matrix is a lattice panel having a light shielding state and a light transmission state; pixel points on the light shielding matrix are arranged in correspondence to respective blocks on the display panel; when the pixel points on the light shielding matrix are in the light shielding state, the emission of light in corresponding blocks on the display panel is prevented; and when the pixel points on the light shielding matrix are in the light transmission state, the emission of light in the corresponding blocks on the display panel is allowed.

In one embodiment, a time required for the pixel points on the light shielding matrix to accomplish change from the light shielding state into the light transmission state in order is within a time of persistence of vision.

In one embodiment, a distance between the display panel and the light shielding matrix is determined according to an imaging angle, a resolution of the acquired image, and a screen refreshing frequency and a resolution of the display panel.

In one embodiment, the respective blocks on the display panel are array-arranged horizontally and/or vertically.

In one embodiment, the image acquisition lattice includes acquisition points in a virtual rendering, or acquisition points in an actual environment.

In one embodiment, acquisition points in the image acquisition lattice are arranged in one of the following manners: only in a horizontal direction; only in a vertical direction; in the horizontal direction and the vertical direction simultaneously; in spherical manner; and in a manner of a curve.

In one embodiment, the image acquisition lattice is also configured to compensate for an absence image through an interpolation operation, or assign an image to each acquisition point through constructing a virtual 3D model construction and in a manner of image rendering.

In one embodiment, the dynamic stereo and holographic display further includes an image acquisition and compressor configured to perform an image compression processing on the image acquired by the image acquisition lattice at each acquisition point, and provide the compressed image to the encoder.

The dynamic stereo and holographic display, according to the embodiments of the present invention, can display a dynamic stereo and holographic image, and directly reflect different real sides of an object. The dynamic stereo and holographic display has a simple and reasonable structure and good performances, and it is conveniently operable, and economical and practical.

Figure 1:
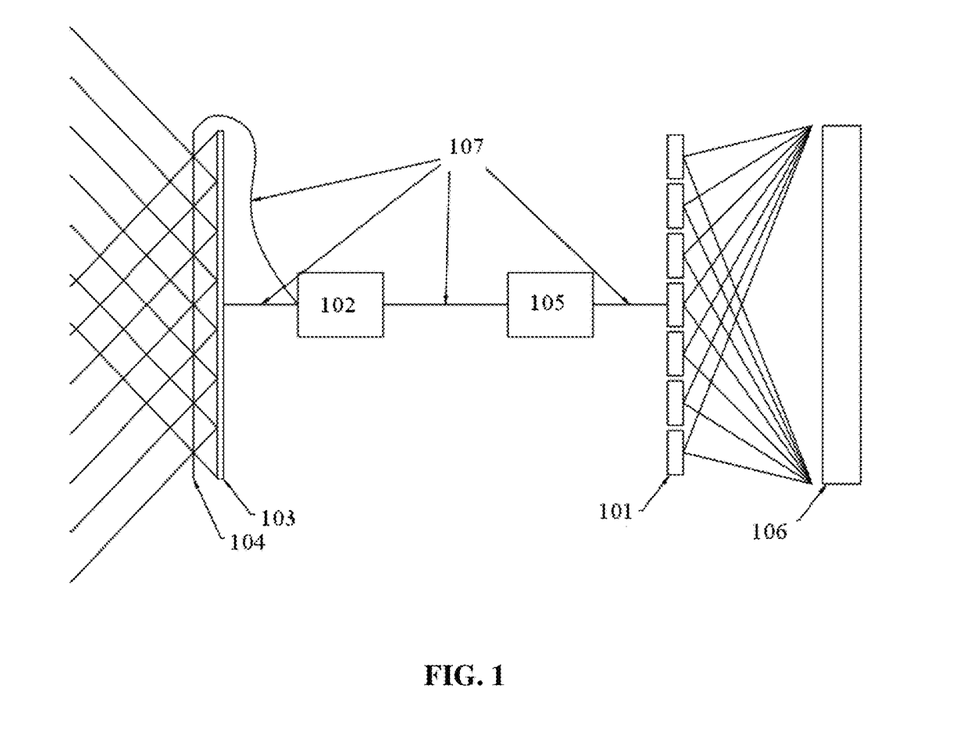
FIG. 1 is a schematic diagram of a dynamic stereo and holographic display according to an embodiment of the present invention.

FIG. 1 is a schematic diagram of a dynamic stereo and holographic display according to an embodiment of the present invention. As illustrated in FIG. 1, the dynamic stereo and holographic display may include:

an image acquisition lattice 101, an encoder 102, a display panel 103 and a light shielding matrix 104;

wherein the image acquisition lattice 101 acquires an image at each acquisition point;

the encoder 102 is configured to provide the image acquired by the image acquisition lattice 101 at each acquisition point to the display panel 103 for display, wherein the image acquired at each acquisition point is provided to a corresponding block of the display panel 103 for display;

the display panel 103 is configured to display a corresponding image in each block; and the light shielding matrix 104 is disposed in front of the display panel 103, and configured to restrict emission of light in a specified block on the display panel 103 under the control of the encoder 102.

Still as illustrated in FIG. 1, during implementation, the dynamic stereo and holographic display according to an embodiment of the present invention may further include:

an image acquisition and compressor 105 configured to perform an image compression processing on the image acquired by the image acquisition lattice 101 at each acquisition point, and provide the compressed image to the encoder 102.

In addition, FIG. 1 further illustrates an image source 106 (e.g., scene) and a data transmission cable 107, wherein the data transmission cable 107 connects the image acquisition lattice 101 with the image acquisition and compressor 105, connects the image acquisition and compressor 105 with the encoder 102, connects the encoder 102 with the display panel 103, and connects the encoder 102 with the light shielding matrix 104.

During implementation, the display panel may be divided into blocks, which can be array-arranged in a horizontal direction and a vertical direction simultaneously, or only in the horizontal direction, or only in the vertical direction. After the image acquisition lattice acquires an image at each acquisition point, the encoder provides the image acquired by the image acquisition lattice at each acquisition point to the display panel for display, wherein the image acquired at each acquisition point is provided to a block of the display panel to the acquisition point for display. The display panel displays a corresponding image in each block.

During implementation, control of chromatic characteristics of the light at a specific angle can be achieved through cooperation between the display panel and the light shielding matrix. The light shielding matrix may be a lattice panel having a light shielding state and a light transmission state. Pixel points on the light shielding matrix may be arranged in correspondence to the respective blocks on the display panel. When the pixel points on the light shielding matrix are in the light shielding state, the emission of light in the blocks corresponding to the pixel points on the display panel is prevented; and when the pixel points on the light shielding matrix are in the light transmission state, the emission of light in the blocks corresponding to the pixel points on the display panel is allowed.

Figure 2:
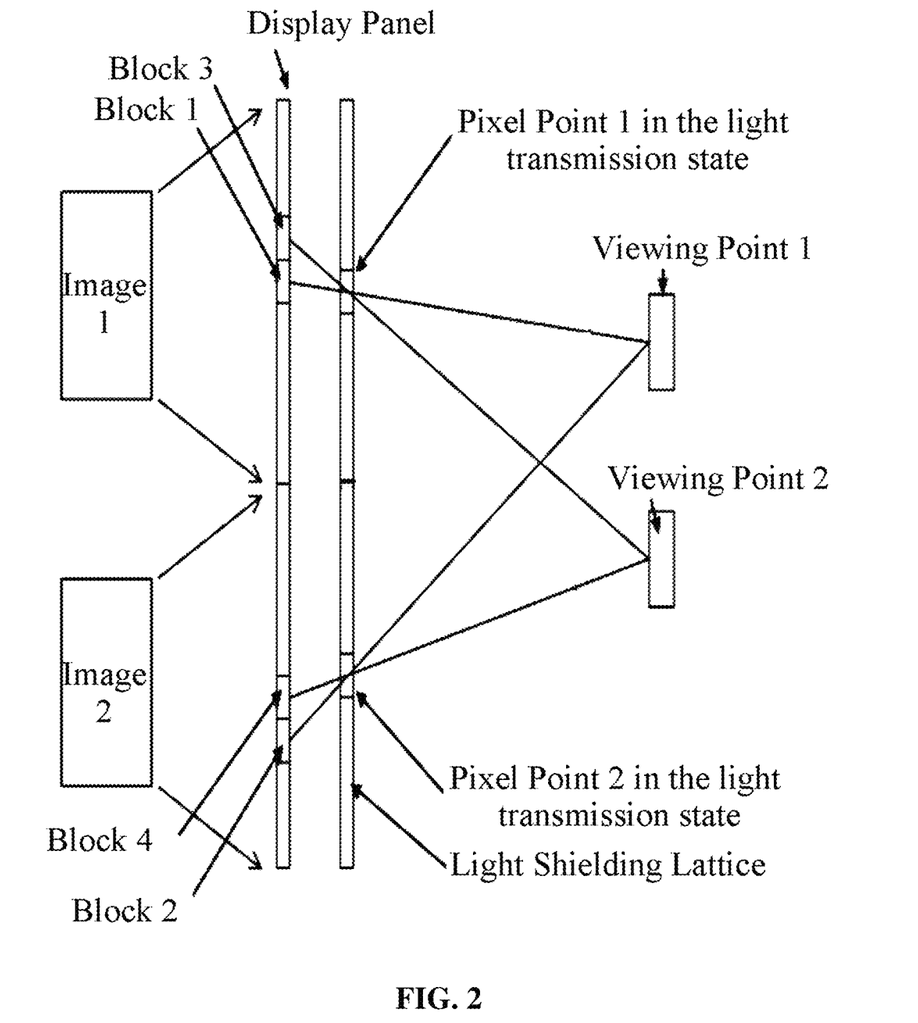
FIG. 2 is a schematic diagram of the change of a viewed image when the viewing angle is changed according to an embodiment of the present invention.

During implementation, the image displayed on the display panel is shielded by the light shielding matrix. When the pixel points on the light shielding matrix are changed from the light shielding state into the light transmission state, the viewer can see the image displayed in the corresponding block on the display panel through the pixel points in the light transmission state within a range of a visible angle. During implementation, when the viewing angle is changed, the corresponding block on the display panel seen through the pixel points on the light shielding matrix in the light transmission state would also be changed. FIG. 2 is a schematic diagram of the change of a viewed image when the viewing angle is changed according to an embodiment of the present invention. As illustrated in FIG. 2, when the viewer is located at a viewing point 1 at timing 1, the images displayed in blocks 1 and 2 on the display panel can be seen through pixel points 1 and 2 on the light shielding matrix in the light transmission state; and when the viewer is located at a viewing point 2 at timing 2, the images displayed in blocks 3 and 4 on the display panel can be seen through the pixel points 1 and 2 on the light shielding matrix in the light transmission state. It can be seen that the dynamic stereo and holographic display according to the embodiment of the present invention can control the light emitted from the display panel at different angles through each pixel point on the light shielding matrix within a visible range.

During implementation, the pixel points on the light shielding matrix one by one repeats the process of changing from the light shielding state into the light transmission state, and a better dynamic stereo and holographic image can be recovered when the time required for the pixel points on the light shielding matrix to accomplish the change from the light shielding state into the light transmission state in order is within the time of persistence of vision. During implementation, under the control of the encoder, the specific pixel points on the light shielding matrix change to be in the light transmission state to allow light transmission and it can be observed that the display panel displays a specific image at that time; the light intensity and chromatic characteristics in the direction can be determined from the blocks on the display panel and corresponding pixel points on the light shielding matrix in the light transmission state; each block on the display panel and the pixel points on the light shielding matrix in the light transmission state can correspond to an angle; the time required for the pixel points on the light shielding matrix to accomplish the change into the light transmission state in order is within the time of a persistence of vision, i.e., the frequency for completing a holographic screen is at least the number of frames required by persistence of vision, thus a smooth dynamic stereo and holographic image can be formed.

During implementation, although the display panel is described as a panel, it does not mean that the shape thereof is restricted to be square. In fact, its shape may be any shape required, such as a circular shape, a polygonal shape, an irregular shape or a curved shape. Similarly, the light shielding matrix may also be implemented to have different shapes. The display panel and the light shielding matrix are generally arranged in parallel. Although the parallel arrangement is described herein, it does not mean that their corresponding positional relationship is parallel along line, and it is also possible to be parallel along curve or parallel along broken line. The so called parallel represents the basic positional relationship between the two in general, and shall not be strictly understood as absolute parallel. Between the display panel and the light shielding matrix, there is a certain distance that can be determined according to the imaging angle, the resolution of the acquired image, the screen refreshing frequency and resolution of the display panel, etc. During implementation, other optical element may also be placed in front of or behind the light shielding matrix to improve the display quality or the display characteristics. During implementation, a block on the display panel may be a pixel. The display panel and the light shielding matrix may have a resolution of 1280×1024 pixels, or other resolution. The pixel may have a diameter of several micrometers, and the pixel size may be uniform, which is determined by the process used during implementation. When a pixel point is described to have a diameter, it does not mean that the shape of the pixel point is restricted to be circular or nearly circular. Instead, the pixel point may have any shape, such as a circular shape, an oval shape, a rectangular shape, a square shape or a squarish shape.

During implementation, the image acquisition lattice acquires a plurality of images, and the image acquisition and compressor performs a compression processing on the images to obtain dynamic stereo and holographic image data. The image acquisition lattice acquires an image at each acquisition point. For example, regarding a scene, the image acquisition lattice acquires the image corresponding to each acquisition point. Those images are transmitted to the image acquisition and compressor through the data transmission cable, and then transmitted to the encoder through the data transmission cable.

The image acquisition lattice acquires the images by arranging image acquisition points in a space or a virtual space. During implementation, the image acquisition lattice may include acquisition points in the virtual rendering, or acquisition points in the actual environment. The acquisition points may be arranged in multiple manners in the image acquisition lattice. For example, the acquisition points may be arranged only in a horizontal direction, only in a vertical direction, or in the horizontal and vertical directions simultaneously. During implementation, the acquisition points may also be arranged in a spherical manner or in a manner of a curve.

During implementation, when the required acquisition points are more than the actual acquisition points, the image acquisition lattice may also be configured to compensate for the default image through an interpolation operation, or add an image to each acquisition point through a virtual 3D model construction in a manner of image rendering.

Figure 3:
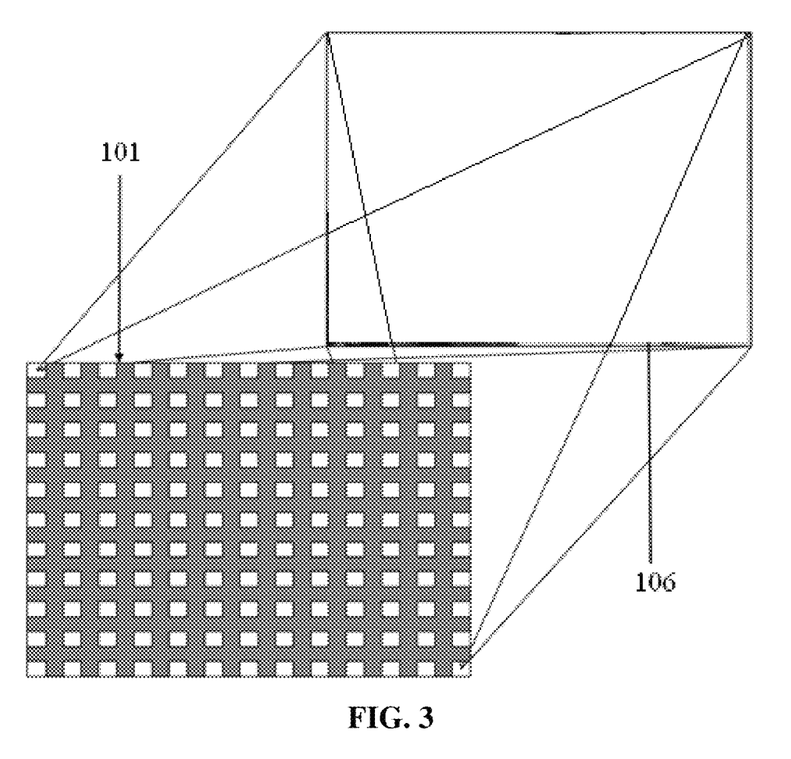
FIG. 3 is a principle diagram of an image acquisition by a dynamic stereo and holographic display according to an embodiment of the present invention.
Figure 4:
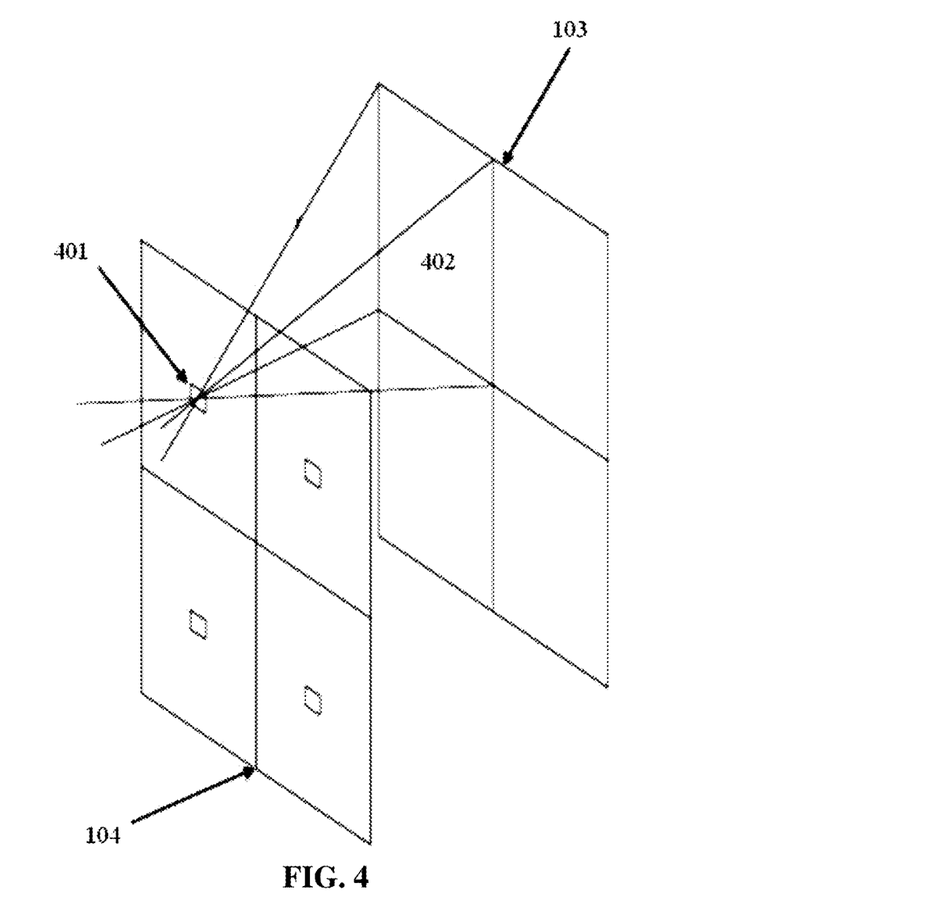
FIG. 4 is a principle diagram of an image display by a dynamic stereo and holographic display according to an embodiment of the present invention.

FIG. 3 is a principle diagram of image acquisition by a dynamic stereo and holographic display according to an embodiment of the present invention. As illustrated in FIG. 3, the image acquisition is performed for a scene 106 through an image acquisition lattice 101, and one image is acquired by the acquisition point at each position. FIG. 4 is a principle diagram of an image display by a dynamic stereo and holographic display according to an embodiment of the present invention. As illustrated in FIG. 4, an image is displayed on a corresponding block of a display panel 103 under the control of an encoder, and the respective blocks are array-arranged on the display panel 103 in a horizontal direction and a vertical direction simultaneously. Pixel points 401 on a light shielding matrix 104 corresponding to the position of the block on the display panel change into the light transmission state, so that the image in the corresponding block 402 on the display panel 103 transmits through the pixel points 401 of the light shielding matrix 104, thereby recovering a dynamic stereo and holographic image.

Figure 5:
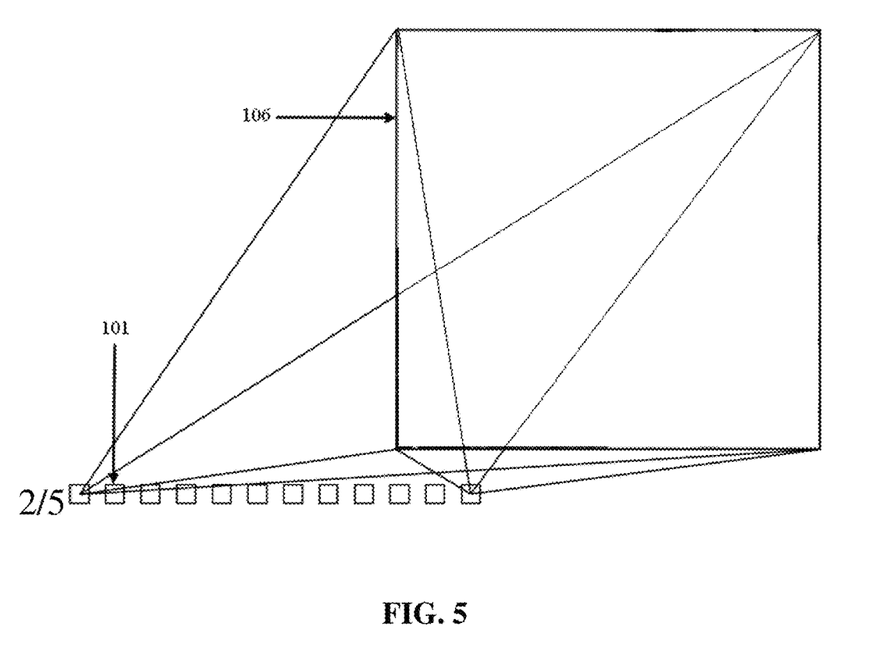
FIG. 5 is a principle diagram of unidirectional image acquisition by a dynamic stereo and holographic display according to an embodiment of the present invention.
Figure 6:
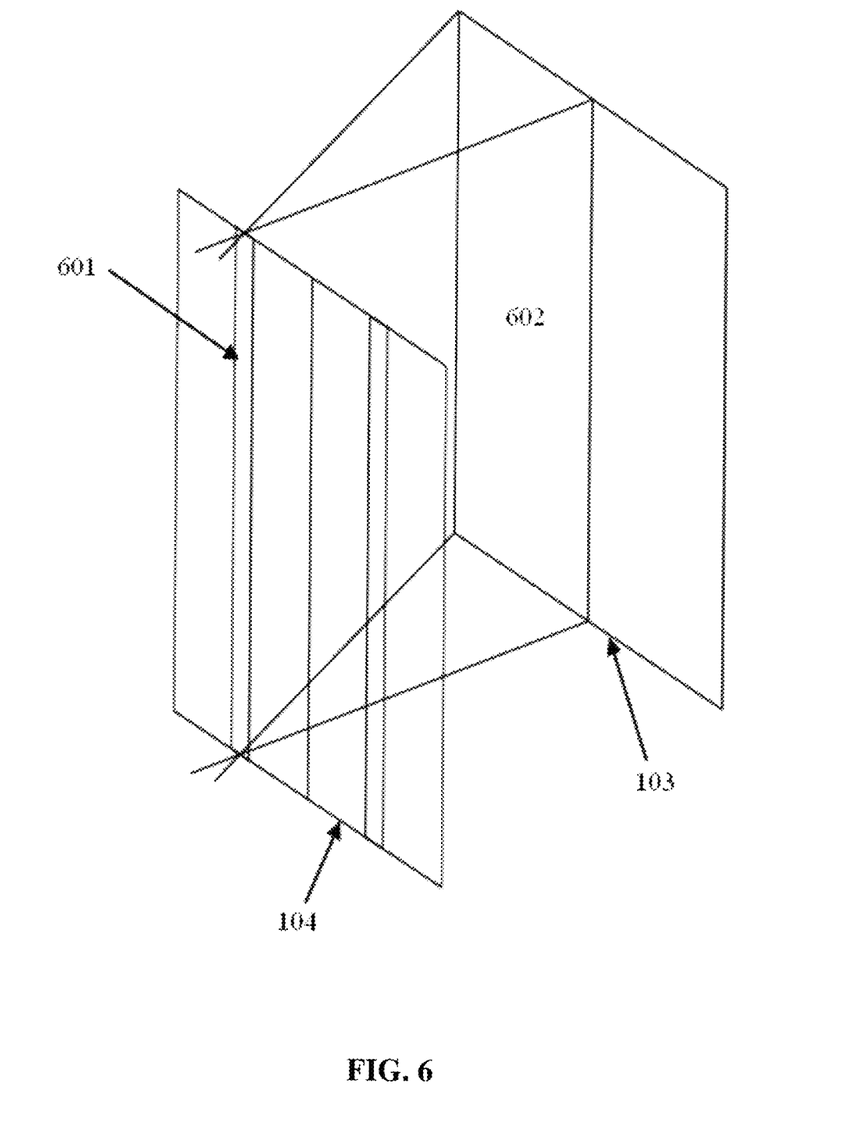
FIG. 6 is a principle diagram of an image display by a dynamic stereo and holographic display according to an embodiment of the present invention.

FIG. 5 is a principle diagram of unidirectional image acquisition by a dynamic stereo and holographic display according to an embodiment of the present invention. As illustrated in FIG. 5, an image acquisition may be performed for a scene 106 through a unidirectional image acquisition lattice 101, and one image is acquired by the acquisition point at each position. FIG. 6 is a principle diagram of image display by a dynamic stereo and holographic display according to an embodiment of the present invention. As illustrated in FIG. 6, an image is displayed on a corresponding block of a display panel 103 under the control of an encoder, and the respective blocks are array-arranged on the display panel 103 in a horizontal direction or a vertical direction (in FIG. 6, the blocks are array-arranged only in the vertical direction). Pixel points 601 (strip shaped) on a light shielding matrix 104 corresponding to the position of the block on the display panel 103 change into the light transmission state, so that the image in the corresponding block 602 on the display panel 103 transmits through the pixel points 601 of the light shielding matrix 104, thereby recovering a dynamic stereo and holographic image.

In summary, the dynamic stereo and holographic display according to the embodiments of the present invention can display a dynamic stereo and holographic image, and directly reflect the different real sides of an object. The dynamic stereo and holographic display has a simple and reasonable structure and good performances, and it is conveniently operable, and economical and practical. In addition, the dynamic stereo and holographic image displayed by the dynamic stereo and holographic display according to the embodiment of the present invention has a larger maximum viewing angle, and the pixels are utilized sufficiently and effectively.

The dynamic stereo and holographic display according to the embodiment of the present invention can be applied to various types of displays, such as a cathode ray tube display, a liquid crystal display, a plasma display, a rear projection display, etc.

Through the above embodiments, the object, technical solution and beneficial effects of the present invention are further described in detail. It shall be appreciated that those descriptions are just specific embodiments of the present invention, rather than limiting the protection scope of the present invention. Any modification, equivalent replacement, improvement, etc. made within the spirit and principle of the present invention shall fall within the protection scope of the present invention.

What is claimed is:

1. A dynamic stereo and holographic display, comprising:
an image acquisition lattice, an encoder, a display panel, and a light shielding matrix;
wherein the image acquisition lattice comprises a plurality of acquisition points arranged in an array, and the image acquisition lattice acquires an image at each acquisition point;
the image acquired by the image acquisition lattice at each acquisition point is provided by the encoder to the display panel for display, wherein the image acquired at each acquisition point is provided to a block corresponding to said acquisition point of the display panel for display;
a corresponding image is displayed in each block on the display panel; and
the light shielding matrix is disposed in front of the display panel, wherein emission of light in a specified block on the display panel is restricted by the light shielding matrix under the control of the encoder, wherein the light shielding matrix is a lattice panel having a light shielding state and a light transmission state.

2. The dynamic stereo and holographic display according to claim 1, wherein pixel points on the light shielding matrix are arranged in correspondence to respective blocks on the display panel; where the pixel points on the light shielding matrix are in the light shielding state, the emission of light in blocks corresponding to said pixel points on the display panel is prevented; and where the pixel points on the light shielding matrix are in the light transmission state, the emission of light in the blocks corresponding to said pixel points on the display panel is allowed.

3. The dynamic stereo and holographic display according to claim 2, wherein a time required for the pixel points on the light shielding matrix to accomplish change from the light shielding state into the light transmission state in order is within a time of persistence of vision.

4. The dynamic stereo and holographic display according to claim 1, wherein a distance between the display panel and the light shielding matrix is determined according to an imaging angle, a resolution of the acquired image, and a screen refreshing frequency and a resolution of the display panel.

5. The dynamic stereo and holographic display according to claim 1, wherein the respective blocks on the display panel are array-arranged horizontally and/or vertically.

6. The dynamic stereo and holographic display according to claim 1, wherein the image acquisition lattice comprises acquisition points in a virtual rendering and acquisition points in an actual environment.

7. The dynamic stereo and holographic display according to claim 1, wherein acquisition points in the image acquisition lattice are arranged in one of the following manners:
only in a horizontal direction;
only in a vertical direction;
in the horizontal direction and the vertical direction simultaneously;
in a spherical manner; and
in a manner of a curve.

8. The dynamic stereo and holographic display according to claim 1, wherein the image acquisition lattice is also configured to compensate for an absence image through an interpolation operation, or assign an image to each acquisition point by constructing a virtual 3D model and in a manner of image rendering.

9. The dynamic stereo and holographic display according to claim 1, further comprising:
an image acquisition and compressor configured to perform an image compression processing on the image acquired by the image acquisition lattice at each acquisition point, and provide the compressed image to the encoder.

* * * * *